United States Patent
Mori

(10) Patent No.: US 12,130,203 B2
(45) Date of Patent: Oct. 29, 2024

(54) CONTROL METHOD, CONTROL DEVICE, CONTROL SYSTEM, AND TIRE TESTING METHOD

(71) Applicant: BRIDGESTONE CORPORATION, Tokyo (JP)

(72) Inventor: Ryosuke Mori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 323 days.

(21) Appl. No.: 17/619,839

(22) PCT Filed: Jul. 21, 2020

(86) PCT No.: PCT/JP2020/028336
§ 371 (c)(1),
(2) Date: Dec. 16, 2021

(87) PCT Pub. No.: WO2021/015212
PCT Pub. Date: Jan. 28, 2021

(65) Prior Publication Data
US 2022/0349781 A1    Nov. 3, 2022

(30) Foreign Application Priority Data
Jul. 22, 2019   (JP) ................. 2019-134887

(51) Int. Cl.
*G01M 17/02* (2006.01)
*G01M 17/007* (2006.01)

(52) U.S. Cl.
CPC .......... *G01M 17/02* (2013.01); *G01M 17/007* (2013.01)

(58) Field of Classification Search
CPC .. G01M 17/02; G01M 17/007; G01M 17/025; B60W 50/0098; B60W 60/00;
(Continued)

(56) References Cited

U.S. PATENT DOCUMENTS

| | | | |
|---|---|---|---|
| 6,216,082 B1 | 4/2001 | Minowa et al. | |
| 6,446,501 B1* | 9/2002 | Domeck | G01M 17/007 73/146 |
| 9,168,924 B2* | 10/2015 | Lee | B60W 50/04 |

(Continued)

FOREIGN PATENT DOCUMENTS

| | | |
|---|---|---|
| AU | 2022203622 B2 | 6/2022 |
| CN | 103903435 A | 7/2014 |

(Continued)

OTHER PUBLICATIONS

Search Report of Office Action issued Jun. 29, 2024 in Chinese Application No. 202080052368.6.
(Continued)

*Primary Examiner* — Andrew R Dyer
(74) *Attorney, Agent, or Firm* — Sughrue Mion, PLLC

(57) ABSTRACT

A control method of a vehicle (1) according to the present disclosure is a control method for controlling the vehicle (1) that has tires (6) mounted thereon and drives autonomously on a course (200) that includes a banked section. The control method includes a setting step of setting a weighting for a plurality of sensors (12) configured to detect information about the vehicle (1) or the course (200), and a detection step of performing detection of a position of the vehicle (1) and/or an obstacle around the vehicle (1) using the weighting for the plurality of sensors (12) and a detection result of the sensors (12). In the setting step, the weighting is changed between the banked section (230) and sections other than the banked section (230).

9 Claims, 4 Drawing Sheets

(58) Field of Classification Search
CPC . B60W 2050/0025; B60W 2050/0075; B60W 2552/15; B60W 2556/50
USPC .............................................................. 701/1
See application file for complete search history.

(56) References Cited

U.S. PATENT DOCUMENTS

| | | | |
|---|---|---|---|
| 9,625,582 B2 | 4/2017 | Gruver et al. | |
| 2006/0220912 A1 | 10/2006 | Heenan et al. | |
| 2008/0186330 A1* | 8/2008 | Pendleton | A63F 13/65 |
| | | | 345/619 |
| 2009/0028440 A1* | 1/2009 | Elangovan | H04N 5/272 |
| | | | 382/103 |
| 2013/0190944 A1* | 7/2013 | Brandin | G01C 21/26 |
| | | | 701/1 |
| 2014/0090461 A1* | 4/2014 | Cuttino | G01M 17/02 |
| | | | 73/118.01 |
| 2014/0266651 A1 | 9/2014 | Ansari et al. | |
| 2015/0057779 A1* | 2/2015 | Saungsomboon | G06F 3/16 |
| | | | 700/94 |
| 2015/0217607 A1* | 8/2015 | Singh | B60C 23/0488 |
| | | | 73/146.3 |
| 2016/0114727 A1 | 4/2016 | Watanabe | |
| 2016/0282468 A1 | 9/2016 | Gruver et al. | |
| 2016/0292865 A1* | 10/2016 | Floor | H04N 23/90 |
| 2017/0068248 A1* | 3/2017 | Kobayashi | B60W 10/20 |
| 2018/0031384 A1 | 2/2018 | Lee et al. | |
| 2018/0154902 A1* | 6/2018 | Shami | G01C 21/28 |
| 2018/0201077 A1* | 7/2018 | Xie | G01M 17/022 |
| 2018/0201273 A1* | 7/2018 | Xiao | B60W 30/18154 |
| 2018/0341812 A1* | 11/2018 | Floor | G06V 20/42 |
| 2018/0348775 A1* | 12/2018 | Yu | B60W 30/1882 |
| 2019/0187713 A1* | 6/2019 | Shizuka | G05D 1/0212 |
| 2019/0210591 A1* | 7/2019 | Low | B60W 50/085 |
| 2019/0365289 A1* | 12/2019 | Kataoka | A61B 5/1122 |
| 2019/0381419 A1* | 12/2019 | Swyers | A63K 1/00 |
| 2020/0158869 A1* | 5/2020 | Amirloo Abolfathi | |
| | | | G06T 7/521 |
| 2020/0184849 A1* | 6/2020 | Spence | B60W 30/18145 |
| 2021/0025784 A1* | 1/2021 | Matsumoto | G01M 17/021 |
| 2021/0197619 A1* | 7/2021 | Tokiwa | B60C 9/2006 |
| 2021/0272398 A1 | 9/2021 | Mori et al. | |
| 2022/0024259 A1* | 1/2022 | Fraenkel | B60W 40/10 |

FOREIGN PATENT DOCUMENTS

| | | |
|---|---|---|
| CN | 105667518 A | 6/2016 |
| CN | 107430195 A | 12/2017 |
| CN | 108021133 A | 5/2018 |
| CN | 108762226 A | 11/2018 |
| CN | 109131326 A | 1/2019 |
| CN | 109187042 A | 1/2019 |
| CN | 109643367 A | 4/2019 |
| CN | 109668742 A | 4/2019 |
| JP | 08-036691 A | 2/1996 |
| JP | 8-318765 A | 12/1996 |
| JP | 2001-154733 A | 6/2001 |
| JP | 2007-164432 A | 6/2007 |
| JP | 2013-092452 A | 5/2013 |
| JP | 2013-134213 A | 7/2013 |
| JP | 2019-82831 A | 5/2019 |
| JP | 2020-006718 A | 1/2020 |
| JP | 2020-012711 A | 1/2020 |

OTHER PUBLICATIONS

Chinese Search Report dated Sep. 11, 2024 in Application No. 202080052368.6.

* cited by examiner

CONTROL METHOD, CONTROL DEVICE, CONTROL SYSTEM, AND TIRE TESTING METHOD

CROSS REFERENCE TO RELATED APPLICATIONS

This application is a National Stage of International Application No. PCT/JP2020/028336, filed Jul. 21, 2020, claiming priority to Japanese Patent Application No. 2019-134887, filed Jul. 22, 2019.

TECHNICAL FIELD

The present disclosure relates to a control method, a control device, a control system, and a tire testing method.

BACKGROUND

A bench-top testing method and an actual vehicle testing method are known methods for testing tires. An example of the bench-top testing method is a method to bring a pseudo-surface of a drum into contact with a tire and detect the noise emitted by the tire while the drum is rotating (see Patent Literature 1). On the other hand, in an actual vehicle testing method, various tests are conducted while a vehicle is actually driven around a test course.

CITATION LIST

Patent Literature
  PTL 1: JP 2013-134213 A

SUMMARY (Technical Problem)

In recent years, in the above-described actual vehicle tests on tires, data has been acquired by mounting tires on a vehicle equipped with an autonomous driving function and driving the vehicle. In the vehicle equipped with an autonomous driving function, the vehicle position and obstacles around the vehicle are detected based on the detection results of sensors installed in the vehicle or on the course, and the driving of the vehicle is controlled based on these detection results.

Courses for tire testing often include banked sections having a curved shape and an inclined road surface that slopes upward from the inner periphery of the curve to the outer periphery so that the vehicle can change the driving direction without reducing the speed of the vehicle. In the banked section, the road surface is curved and inclined. Therefore, depending on the type of the sensor, the detection accuracy may decrease, or detection failure may occur. When such failure occurs, it becomes difficult to detect the position of the vehicle and obstacles around the vehicle. Driving on the banked section in such a state is not desirable in terms of safety.

In light of the above problems, it is an aim of the present disclosure to provide a control method, a control device, a control system, and a tire testing method that can improve the driving safety of vehicles in a banked section.

(Solution to Problem)

A control method according to an embodiment of the present disclosure is a control method for controlling a vehicle that has tires mounted thereon and drives autonomously on a course, the course including a banked section, the control method including a setting step of setting a weighting for a plurality of sensors configured to detect information about the vehicle or the course, and a detection step of performing detection of a position of the vehicle and/or an obstacle around the vehicle using the weighting for the plurality of sensors and a detection result of the sensors. In the setting step, the weighting is changed between the banked section and sections other than the banked section.

A control device according to an embodiment of the present disclosure is a control device for controlling a vehicle that has tires mounted thereon and drives autonomously on a course, the course including a banked section, the control device including a controller configured to set a weighting for a plurality of sensors configured to detect information about the vehicle or the course, and perform detection of a position of the vehicle and/or an obstacle around the vehicle using the weighting for the plurality of sensors and a detection result of the sensors. The controller is configured to change the weighting between the banked section and sections other than the banked section.

A control system according to an embodiment of the present disclosure includes a control device for controlling a vehicle that has tires mounted thereon and drives autonomously on a course, and a plurality of sensors configured to detect information about the vehicle or the course. The course includes a banked section, and the control device includes a controller configured to set a weighting for the plurality of sensors, and perform detection of a position of the vehicle and/or an obstacle around the vehicle using the weighting for the plurality of sensors and a detection result of the sensors. The controller is configured to change the weighting between the banked section and sections other than the banked section.

A tire testing method according to an embodiment includes a step of controlling, in accordance with the above-described control method, the vehicle to drive on the course, and a step of acquiring test data of tires mounted on the vehicle driving on the course. The course is a course for testing the tires.

(Advantageous Effect)

According to the present disclosure, a control method, a control device, a control system, and a tire testing method that can improve the driving safety of vehicles in a banked section can be provided.

DETAILED DESCRIPTION

Embodiments of the present disclosure are described below through examples with reference to the drawings. In each drawing, the same reference sign indicates the same or equivalent components.

Figure 1:
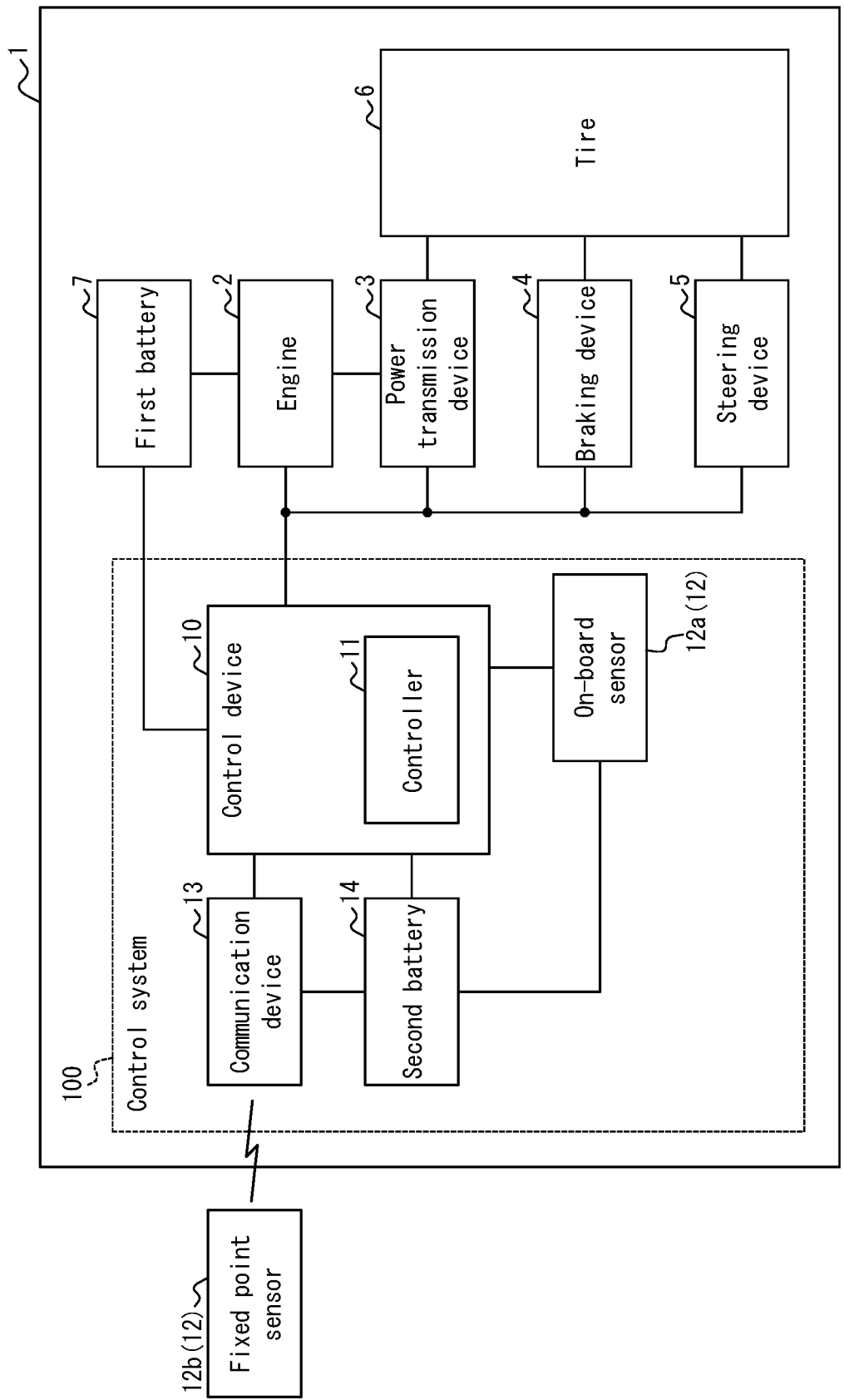
FIG. 1 is a block diagram illustrating an example configuration of a vehicle that includes a control device according to an embodiment of the present disclosure.

FIG. 1 is a block diagram illustrating an example configuration of a vehicle 1 that includes a control device 10 according to an embodiment of the present disclosure. The vehicle 1 includes tires 6 and drives on a course 200, illustrated in FIG. 2, for testing the tires 6. Details of the course 200 will be described later.

As illustrated in FIG. 1, the vehicle 1 includes an engine 2 as a power source, a power transmission device 3, a braking device 4, a steering device 5, tires 6, and a first battery 7. The power transmission device 3 includes a transmission or the like. The braking device 4 includes brakes or the like. The steering device 5 includes a steering wheel or the like. The vehicle 1 may include a motor instead of the engine 2 as a power source, or may include both the engine 2 and a motor.

The vehicle 1 is autonomously driven by the control system 100, described below. The autonomous driving level may, for example, be from level 3 to 5 as defined by the Society of Automotive Engineering (SAE).

The vehicle 1 starts the engine 2 using electric power from the first battery 7. The vehicle 1 may include a variety of electrical devices or electronic devices. The vehicle 1 may operate the electrical devices or electronic devices using electric power from the first battery 7 or the electric power of an alternator that generates electric power using power from the engine 2. The first battery 7 may be a secondary battery, such as a lead-acid battery or a lithium-ion battery.

The vehicle 1 further includes the control device 10 and an on-board sensor 12a.

The control device 10 controls autonomous driving of the vehicle 1 by controlling the engine 2, the power transmission device 3, the braking device 4, and the steering device 5. The control device 10 includes a controller 11. The controller 11 may include an arithmetic logic unit such as a central processing unit (CPU). The controller 11 may include a storage device such as a memory. The control device 10 may include a storage apart from the controller 11.

The controller 11 acquires detection results from all or a portion of a plurality of sensors 12 (the on-board sensor 12a and a fixed point sensor 12b, described below) and detects the position of the vehicle 1 and obstacles around the vehicle 1 based on the acquired detection results. The controller 11 controls the driving of the vehicle 1 based on the detection results of the position of the vehicle 1 and the obstacles around the vehicle 1.

The sensors 12 monitor the vehicle 1 or the course 200 and detect information about the vehicle 1 or the course 200. A plurality of sensors 12 is provided to detect various types of information about the vehicle 1 or the course 200. The sensors 12 may include the on-board sensor 12a mounted on the vehicle 1 and the fixed point sensor 12b installed along the course 200. The on-board sensor 12a mainly acquires information about the vehicle 1 on which the on-board sensor 12a is mounted. The information detected by the on-board sensor 12a may include information about the state of the vehicle 1, such as the position or the speed of the vehicle 1. The information detected by the on-board sensor 12a may include information about the conditions around the vehicle 1. The on-board sensor 12a may acquire information from various meters mounted on the vehicle 1, such as a speedometer, a tachometer, a fuel meter, or an odometer. The on-board sensor 12a may include a Global Positioning System (GPS) sensor that detects the position of the vehicle 1 using a positioning system such as GPS. The on-board sensor 12a may include a speed sensor that detects the speed of the vehicle 1 using GPS. The on-board sensor 12a may include a camera, such as a monochrome camera or a stereo camera, that captures images of the area around the vehicle 1. The on-board sensor 12a may include a Light Detection and Ranging (LiDAR) sensor that detects a surrounding object and the distance to the surrounding object by emitting electromagnetic waves, such as infrared waves or millimeter waves, and detecting reflected waves that occur when the electromagnetic waves are reflected by the surrounding object. The fixed point sensor 12b mainly acquires information about the course 200. The information about the course 200 may include information about conditions on the course 200 (for example, the presence or absence of an object such as a vehicle or obstacle). The fixed point sensor 12b may, for example, include a 3D-LiDAR sensor.

The vehicle 1 may further include a communication device 13. The communication device 13 may include a communication interface, such as a local area network (LAN). The communication device 13 may communicate with other devices, such as the fixed point sensor 12b, via the communication interface.

The vehicle 1 may further include a second battery 14. The second battery 14 may be a primary battery or a secondary battery. The second battery 14 may supply electric power to each component, such as the control device 10, the on-board sensor 12a, and the communication device 13.

The control device 10, the sensors 12 (on-board sensor 12a and fixed point sensor 12b), the communication device 13, and the second battery 14 form the control system 100 that controls autonomous driving of the vehicle 1. The control system 100 need not include the second battery 14. In this case, each part of the control system 100 (the control device 10, the on-board sensor 12a, and the communication device 13) may be supplied with electric power from the first battery 7.

Figure 2:
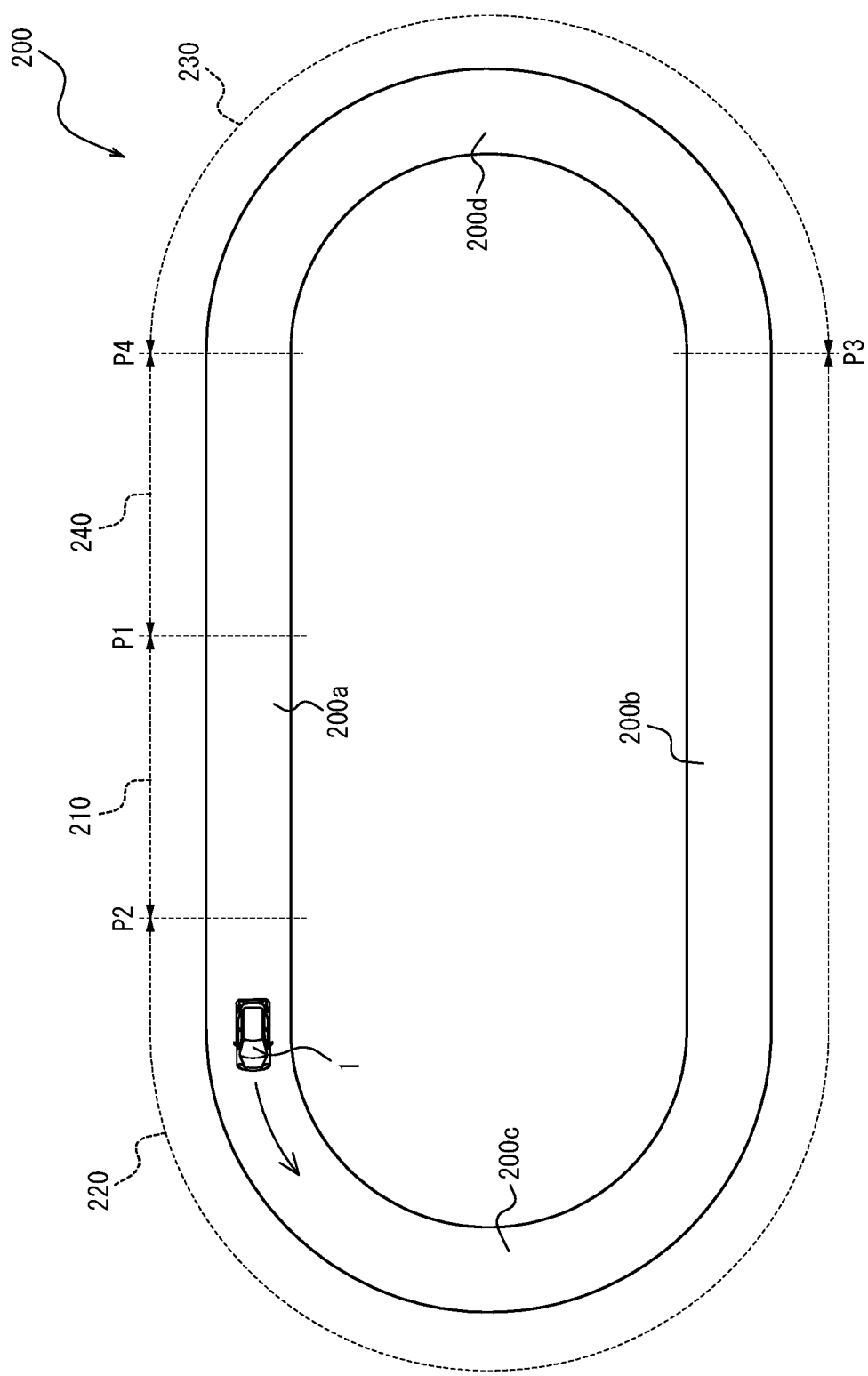
FIG. 2 is a plan view of an example course on which the vehicle illustrated in FIG. 1 drives.

As described above, the vehicle 1 is controlled by the control system 100 to drive autonomously on the course 200. The course 200 is, for example, a course on which the vehicle 1 drives to test the tires 6. FIG. 2 is a plan view of an example of the course 200 on which the vehicle 1 drives to test the tires 6.

As illustrated in FIG. 2, the course 200 is a closed circuit course comprising two straight tracks 200a, 200b extending parallel to each other, and semicircular curved tracks 200c, 200d disposed at the ends of the straight tracks 200a, 200b and connected so as to join the ends of both straight tracks 200a, 200b. The vehicle 1 drives around the course 200, which is a circuit, in a predetermined direction (counter-clockwise in FIG. 2).

The course 200 is divided into a plurality of sections that are provided according to driving rules. For example, the course 200 includes a test section 210 that has a position P1 as a starting point and a position P2 as an ending point. The position P1 and the position P2 are included in the straight track 200a. Therefore, the test section 210 is a straight section. The test section 210 is a section for performing a test of the tires 6. The test of the tires 6 is, for example, a pass by noise (PBN) test. The pass-by noise test is conducted based on a predetermined standard for testing the tires 6. The predetermined standard may, for example, be ECE R117-02, which is an international standard relating to tire unit noise regulation. The road surface in the test section 210 may be a road surface based on the ISO 10844 standard. The test data in the pass-by noise test includes the noise level of driving noise generated by friction between the tires 6 and the road surface during driving of the vehicle 1 on which the tires 6 are mounted. In the pass-by noise test, the test data is acquired in such a way that the driving noise of the vehicle 1 does not include the driving noise of the engine 2 or the motor of the vehicle 1. To do so, the control device 10 stops the engine 2 or motor before the test section 210 (ignition off) and controls the driving of the vehicle 1 so that the vehicle 1 passes through the test section 210 in this state. The driving of the vehicle 1 with the engine 2 or the motor stopped is also referred to as coasting. The control device 10 drives the engine 2 or the motor (ignition on) after the vehicle 1 passes through the test section 210. Test data based on ECE R117-02 includes the noise level of driving noise acquired by driving the vehicle 1 at eight or more test speeds over approximately equal intervals in a range of ±10 km/h relative to a reference speed. After new tires 6 have been mounted on the vehicle 1 and before the test of the tires 6 is started, a break-in run is performed with the vehicle 1. During the break-in run, the vehicle 1 is driven for a predetermined distance.

The distance driven during the break-in run is determined by a predetermined standard. The test of the tires 6 is not limited to a pass-by noise test and may be a different test.

In the case of a pass-by noise test, microphones are arranged on both sides, in the width direction, of the road surface of the test section 210, and the vehicle 1 travels along the center of the road surface of the test section 210 at a predetermined speed. Each of the microphones arranged on the sides of the road surface detects the noise level of the driving noise of the vehicle 1 while the vehicle 1 is driving on the test section 210, and acquires the noise level as test data of the tires 6.

During the pass-by noise test, it is required that no obstructing objects (including other vehicles) be present or enter within a predetermined distance (such as 50 m) while the vehicle 1 is driving through the test section 210 for acquisition of test data. That is, there is a driving rule stating that in the test section 210, the vehicle 1 travels a predetermined route at a predetermined speed for the test, and if another vehicle is traveling in the test section 210, the vehicle 1 should not be in the test section 210 or come within a predetermined distance from the test section 210.

The course 200 further includes an adjustment section 220, a banked section 230, and an acceleration section 240.

The adjustment section 220 has the position P2 as a starting point and a position P3 as an ending point. The position P3 is the position where the straight track 200*b* and the curved track 200*d* are connected. The adjustment section 220 includes a section of the straight track 200*a* after the test section 210, the curved track 220*c*, and the straight track 200*b*. That is, the adjustment section 220 is a section connected to the ending point of the test section 210 and the starting point of the banked section 230, described below. In the adjustment section 220, there is a driving rule stating that the vehicle 1 may drive at any speed along any route. In the adjustment section 220, the vehicle 1 can also overtake and be overtaken by other vehicles. In the adjustment section 220, the order of vehicles entering the test section 210 is adjusted, and other vehicles performing a test are avoided.

The banked section 230 has the position P3 as a starting point and a position P4 as an ending point. The position P4 is the position where the straight track 200*a* and the curved track 200*d* are connected. In the banked section 230, for example, an inclination such that the road surface slopes upward from the inner periphery of the curve to the outer periphery is provided. That is, the banked section 230 has, for example, a curved shape, and the road surface is inclined so as to slope upward from the inner periphery of the curve to the outer periphery. As a result of this inclination, the vehicle 1 drives on the outside of the semicircular corner in the banked section 230 and maintains a constant speed (such as 60 km/h) by using centrifugal force.

In the banked section 230, the vehicle is required to maintain a relatively high speed, even though the view from the vehicle is restricted due to the shape of the banked section 230. Therefore, for the sake of safety, only one vehicle at a time is allowed to drive on the banked section 230. A driving rule thus states that the vehicle travels on the banked section 230 while maintaining a constant speed on the outside of the road surface and does not enter the banked section 230 if another vehicle is traveling on the banked section 230. In accordance with this driving rule, the control device 10 causes the vehicle 1 to stop so as not to enter the banked section 230 if there is another vehicle or an obstacle in the banked section 230.

The acceleration section 240 has the position P4 as a starting point and the position P1 as an ending point. That is, the acceleration section 240 is a section connected to the starting point (position P1) of the test section 210. The distance of the acceleration section 240 is determined according to factors such as the speed required for testing the tires 6 in the test section 210, the type of the tires 6 mounted on the vehicle 1, the load of the vehicle 1, and the performance for acceleration of the vehicle 1. In the acceleration section 240, the control device 10 accelerates the vehicle 1 at a predetermined acceleration rate, for example, to the speed required upon entering the test section 210. Accordingly, there is a driving rule indicating to accelerate in the acceleration section 240 to the speed predetermined for the test.

In this way, the course 200 includes a plurality of sections established according to the driving rules.

Next, a control method for the vehicle 1 according to the present embodiment will be described.

Figure 3:
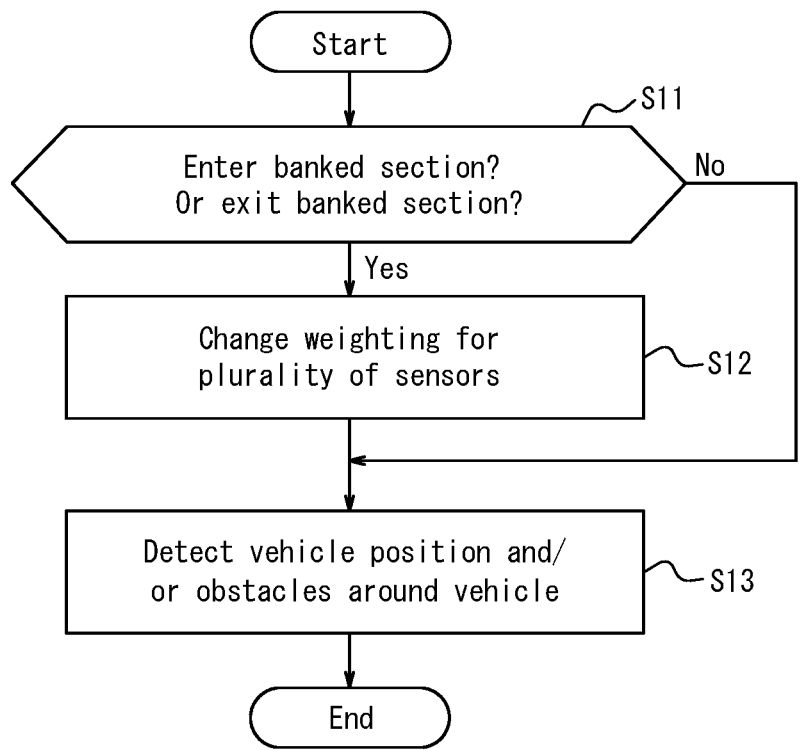
FIG. 3 is a flowchart illustrating an example of operations by the control device illustrated in FIG. 1 when a vehicle enters a banked section or exits the banked section.

FIG. 3 is a flowchart illustrating an example of operations of the control device 10 and a control method of the vehicle 1 according to the present embodiment. In FIG. 3, a case in which the vehicle 1 enters the banked section 230 or exits the banked section 230 is described as an example.

The controller 11 determines whether the vehicle 1 enters the banked section 230 or exits the banked section 230 (step S11). The controller 11 may, for example, determine whether the vehicle 1 enters the banked section 230 or exits the banked section 230 based on a driving scenario that specifies the driving course, the driving speed, and the like of the vehicle 1. The controller 11 may, for example, determine whether the vehicle 1 enters the banked section 230 or exits the banked section 230 based on the detection results of the sensors 12. The controller 11 may determine whether the vehicle 1 enters the banked section 230 or exits the banked section 230 based on an inclination angle of the vehicle 1 detected by an inertial measurement unit (IMU) mounted on the vehicle 1.

As described above, the controller 11 uses the detection results of the plurality of sensors 12 to detect the position of the vehicle 1 and obstacles around the vehicle 1. Here, the controller 11 sets a weighting (confidence level) for the plurality of sensors 12 and uses the weighting and the detection results of the sensors 12 to detect the position of the vehicle 1 and obstacles around the vehicle 1. For example, the detection accuracy can be improved by multiplying the detection result of the sensors 12 by a coefficient representing the confidence level as a weighting. As described in detail below, in the present embodiment, the coefficient representing the reliability of a portion of the sensors 12 can be set to "0" so that the position of the vehicle 1 and the obstacles around the vehicle 1 can be detected using the detection results of the remaining sensors 12 that have high reliability.

When it is determined that the vehicle 1 enters the banked section 230 or exits the banked section 230 (step S11: Yes), the controller 11 changes the weighting for the plurality of sensors 12 (step S12).

The controller 11 then detects the position of the vehicle 1 and/or obstacles around the vehicle 1 using the weighting for the plurality of sensors 12 and the detection results of the sensors 12 (step S13).

When it is determined that the vehicle 1 does not enter the banked section 230 and does not exit the banked section 230 (step S11: No), the controller 11 proceeds to the process of step S13. That is, the controller 11 detects the position of the vehicle 1 and/or obstacles around the vehicle 1 using the same weighting and the detection results of the sensors 12, without changing the weighting for the plurality of sensors 12. Accordingly, in step S12, the controller 11 changes the weighting for the plurality of sensors 12 between the banked section 230 and sections other than the banked section 230.

As was described with reference to FIG. 3, a control method of the vehicle 1 according to the present embodiment includes a setting step of setting a weighting for the plurality of sensors 12 that detect information about the vehicle 1 or the course 200, and a detection step of performing detection of the position of the vehicle 1 and/or an obstacle around the vehicle 1 using the weighting for the plurality of sensors 12 and a detection result of the sensors 12. In the setting step, the controller 11 changes the weighting between the banked section 230 and sections other than the banked section 230. With this configuration, by increasing the weighting of a sensor 12 whose detection accuracy tends not to be affected even in the banked section 230, the position of the vehicle 1 or an obstacle around the vehicle 1 can be detected accurately even in the banked section 230, thereby improving the driving safety of the vehicle 1 in the banked section 230.

Specific examples of the weighting for the plurality of sensors 12 are described below.

As described above, the control device 10 may detect the position of the vehicle 1 and obstacles around the vehicle 1 based on the detection results of the sensors 12. To ensure the safety of autonomous driving of the vehicle 1, a plurality of sensors 12 is provided for each of the position detection function for detecting the position of the vehicle 1 and the obstacle detection function for detecting obstacles around the vehicle 1.

It is assumed below that a mono camera, a GPS sensor, and a 3D-LiDAR sensor are provided for the position detection function. A mono camera is provided at the front and rear of the vehicle 1 and captures images of the area in front and behind the vehicle 1. The mono camera is a sensor (first sensor) that performs two-dimensional detection in a field of view from the vehicle 1. The controller 11 detects a white line provided on the course 200 from an image captured by the mono camera. The GPS sensor is mounted on the vehicle 1 to receive GPS signals and detect the absolute position of the vehicle 1. The 3D-LiDAR sensor is provided protruding from the upper part of the vehicle 1 and detects three-dimensional point cloud data in a field of view including the vehicle 1 and the course 200. The 3D-LiDAR sensor is a sensor (second sensor) that performs three-dimensional detection in an overhead field of view that includes the vehicle 1 and the course 200. The controller 11 detects the position of the vehicle 1 by matching the point cloud data acquired by the 3D-LiDAR sensor with map data stored in advance.

It is also assumed below that a 2D-LiDAR sensor, a 3D-LiDAR sensor, and a stereo camera are provided for the obstacle detection function. The 2D-LiDAR sensor acquires two-dimensional point cloud data for the areas in front, behind, and to the sides of the vehicle 1. The 2D-LiDAR sensor is a sensor (first sensor) that performs two-dimensional detection in a field of view from the vehicle 1. The controller 11 detects obstacles from the point cloud data acquired by the 2D-LiDAR sensor. The 3D-LiDAR sensor is installed by the course 200 and acquires three-dimensional point cloud data in the banked section 230. The stereo camera is installed above the front of the vehicle 1 and captures three-dimensional images of the area in front of the vehicle 1. The 3D-LiDAR sensor and the stereo camera are sensors (second sensor) that perform three-dimensional detection in an overhead field of view that includes the vehicle 1 and the course 200.

As described above, the vehicle 1 drives in the banked section 230 while maintaining a relatively high speed. Consequently, the mono camera may not be able to capture a clear image. In the banked section 230, it is also difficult to capture images at a far distance ahead on the road surface in the field of view of the mono camera installed in the vehicle 1. The detection accuracy of the position of the vehicle 1 using the images captured by the mono camera may therefore be reduced in the banked section 230. On the other hand, since the 3D-LiDAR sensor protruding from the upper part of the vehicle 1 can perform three-dimensional detection in an overhead field of view including the vehicle 1 and the course 200, the detection accuracy is not easily affected, even in the banked section 230 where the road surface is curved and inclined.

In the banked section 230, it is also difficult to perform detection at a far distance ahead on the road surface in the field of view from the 2D-LiDAR sensor installed in the vehicle 1. The detection accuracy of obstacles around the vehicle 1 using the detection result of the 2D-LiDAR sensor may therefore be reduced in the banked section 230. On the other hand, since the 3D-LiDAR sensor installed by the course 200 and the stereo camera installed above the front of the vehicle 1 can perform three-dimensional detection in an overhead field of view including the vehicle 1 and the course 200, the detection accuracy is not easily affected, even in the banked section 230 where the road surface is curved and inclined.

In sections other than the banked section 230, the controller 11 weights the mono camera and the GPS sensor heavily and uses the detection results of the mono camera and the GPS sensor to detect the position of the vehicle 1. In the banked section 230, the controller 11 weights the GPS sensor and the 3D-LiDAR sensor heavily and detects the position of the vehicle 1 using the detection results of the GPS sensor and the 3D-LiDAR sensor. In other words, in the present embodiment, the weighting of the 3D-LiDAR sensor is set to "0" and the detection result of the 3D-LiDAR sensor is not used for detecting the position of the vehicle 1 in sections other than the banked section 230. Furthermore, in the present embodiment, the weighting of the mono camera is set to "0" and the detection result of the mono camera is not used for detecting the position of the vehicle 1 in the banked section 230.

In sections other than the banked section 230, the controller 11 weights the 2D-LiDAR sensor and the 3D-LiDAR sensor heavily and detects obstacles around the vehicle 1 using the detection results of the 2D-LiDAR sensor and the 3D-LiDAR sensor. In the banked section 230, the controller 11 detects obstacles around the vehicle 1 using the detection results of the 3D-LiDAR sensor and the stereo camera. In other words, in the present embodiment, the weighting of the stereo camera is set to "0" and the detection result of the stereo camera is not used for detecting obstacles around the vehicle 1 in sections other than the banked section 230. In the present embodiment, the weighting of the 2D-LiDAR sensor is set to "0" and the detection result of the 2D-LiDAR sensor is not used for detecting obstacles around the vehicle 1 in the banked section 230.

In this way, in the banked section 230, the controller 11 weights the sensor (the 3D-LiDAR sensor in the position detection function, and the 3D-LiDAR sensor and the stereo camera in the obstacle detection function) that performs detection three-dimensionally in the overhead field of view that includes the vehicle 1 and the course 200 more heavily than the sensor (the mono camera in the position detection function and the 2D-LiDAR sensor in the obstacle detection function) that performs detection two-dimensionally in the field of view from the vehicle 1.

When the detection accuracy of the plurality of sensors 12 is equivalent in the banked section 230 or sections other than the banked section 230, the controller 11 may more heavily weight a sensor 12, among the plurality of sensors 12, for which the processing load of the detection result is lower. The controller 11 may also change the weighting in consideration of equipment maintainability/soundness. For example, the white line on the course 200 may become difficult to detect from the image captured by the camera due to dirt or weathering. In addition, it is difficult to immediately restore deteriorated white lines. Accordingly, in the case in which the detection accuracy is equivalent between a camera, serving as a sensor 12, that detects the white line and another sensor 12 that is less affected by the equipment on the course 200, for example, the controller 11 may weight the sensor 12 that is less affected by the equipment on the course 200 more heavily than the camera that detects the white line, in consideration of equipment maintainability/soundness. In this way, the controller 11 may change the weighting for the plurality of sensors 12 in consideration of equipment maintainability/soundness.

As also explained above in the specific examples of weighting for the plurality of sensors 12, the controller 11 detects the position of the vehicle 1 and obstacles around the vehicle 1 using the detection results of two or more sensors 12 both in the banked section 230 and in sections other than the banked section 230. This configuration can improve the detection accuracy, and even when a portion of the sensors 12 fail, this configuration can ensure safety by enabling performance of detection using the detection results of the other sensors 12.

The controller 11 may change the weighting for the plurality of sensors 12 according to the inclination angle of the road surface in the banked section 230. This configuration can suppress a decrease in the detection accuracy of the position of the vehicle 1 or obstacles around the vehicle 1 due to the inclination angle of the road surface in the banked section 230, and the driving safety of the vehicle in the banked section 230 can be ensured. The inclination angle of the road surface can, for example, be detected by an IMU mounted on the vehicle 1.

The controller 11 may, for example, change the weighting for the plurality of sensors 12 according to a comparison between the percentage of the road surface included in the image captured by the camera mounted in front of the vehicle 1 and a predetermined threshold. Furthermore, the controller 11 may, for example, change the weighting for the plurality of sensors 12 according to a comparison between the amount of the white line recognized on the course 200, as detected from the image captured by the camera mounted on the vehicle 1, and a predetermined threshold. As the height of the tires 6 mounted on the vehicle 1 changes, the height of the field of view of each sensor 12 also changes. By setting the above-described thresholds according to the height of the tires 6, the controller 11 can perform appropriate weighting regardless of the height of the tires 6.

The controller 11 may also gradually change the weighting for the plurality of sensors 12 according to the driving position of the vehicle 1. With this configuration, sudden switching of the sensors 12 used to detect the position of the vehicle 1 and obstacles around the vehicle 1 can be prevented, and a sudden stop or the like of the vehicle 1 can be prevented. The controller 11 may monitor the detection state of each sensor 12 and determine whether the sensors 12 used for detecting the position of the vehicle 1 and the obstacles around the vehicle 1 can be switched before changing the weighting.

Figure 4:
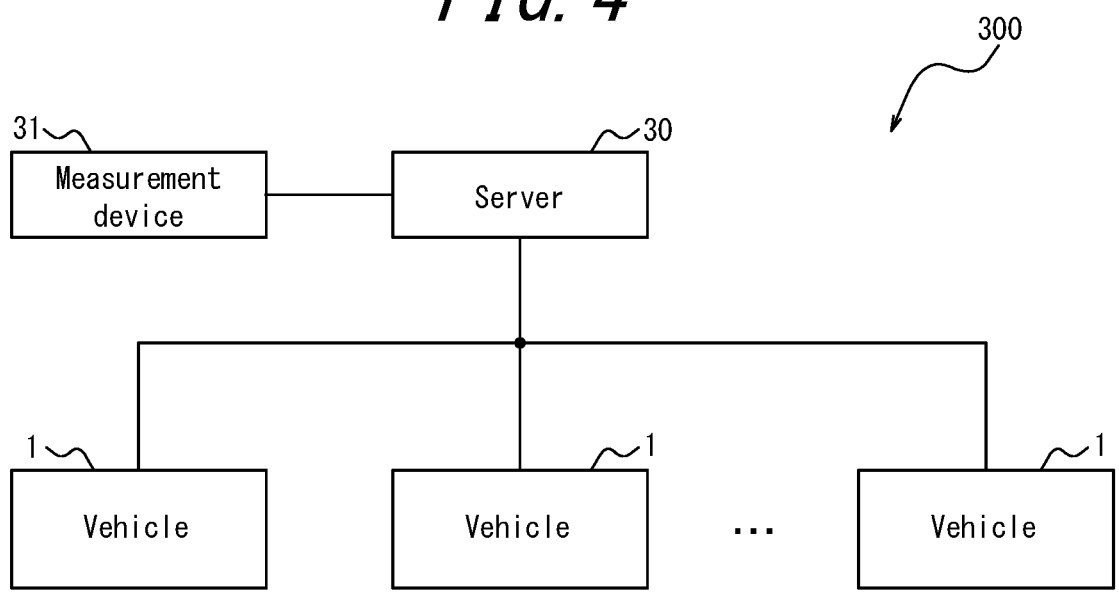
FIG. 4 is a block diagram illustrating an example configuration of a tire testing system for acquiring test data for tires mounted on the vehicle illustrated in FIG. 1.

FIG. 4 illustrates an example configuration of a tire testing system 300 for acquiring test data of the tires 6 mounted on the vehicle 1 driving on the course 200.

As illustrated in FIG. 4, the tire testing system 300 includes a server 30 and a measurement device 31.

The measurement device 31 acquires test data of tires 6 mounted on the vehicle 1 traveling on the course 200. In the case of a pass-by noise test, the measurement device 31 is a microphone provided at both ends in the width direction of the road surface of the test section 210. The measurement device 31 outputs the acquired test data to the server 30.

The server 30 acquires the test data acquired from the measurement device 31. The server 30 includes a communication interface for communicating with the communication device 13 mounted on the vehicle 1, and may communicate via the communication interface with the vehicle 1 (control system 100) that includes the communication device 13. The number of control systems 100 communicating with the server 30 may be one, or may be two or more.

The server 30 manages the test data of the tires 6. The server 30 transmits driving conditions (driving scenarios) of the vehicle 1 for testing the tires 6 to the vehicle 1 on which the tires 6 to be tested are mounted. The driving conditions of the vehicle 1 for testing the tires 6 are also referred to as test conditions. The test conditions may include driving rules for each section (test section 210, adjustment section 220, banked section 230, and acceleration section 240). The test conditions may include information regarding a predetermined standard. The test conditions may include a reference speed of the vehicle 1 at which the test data is to be acquired. The test conditions may include the number of pieces of test data to be acquired.

The test conditions may include a reference for determining whether the acquired test data is normal. As the control device 10 drives the vehicle 1 based on the test conditions, the test data of the tires 6 mounted on the vehicle 1 is acquired by the measurement device 31.

The control device 10 may acquire the test data from the server 30 and determine whether the acquired test data is normal based on the test conditions. When the control device 10 determines that the test data is not normal, the control device 10 may cause the vehicle 1 to drive through the test section 210 to reacquire the test data. The control device 10 may cause the vehicle 1 to drive so as to reacquire only the test data determined not to be normal or may cause the vehicle 1 to drive so as to reacquire all the test data included in the test conditions. When determining that the acquired test data is normal, the control device 10 may terminate the control of the driving of the vehicle 1 based on the test conditions. By the control device 10 terminating the control of the driving of the vehicle 1 based on the determination result for the test data, the probability of redoing the test of the tires 6 is reduced. As a result, the efficiency of the test of the tires 6 is enhanced.

The server 30 may determine whether the acquired test data is normal. The control device 10 may acquire a determination result indicating whether the test data is normal from the server 30. When the control device 10 acquires a determination result indicating that the test data is not normal from the server 30, the control device 10 may cause the vehicle 1 to drive through the test section 210 to reacquire the test data. When the control device 10 acquires a determination result indicating that the test data is normal from the server 30, the control device 10 may terminate the control of the driving of the vehicle 1 based on the test conditions. When determining that the acquired test data is normal, the server 30 may transmit an instruction to the control device 10 to terminate the control of the driving of the vehicle 1 based on the test conditions. The control device 10 may terminate the control of the driving of the vehicle 1 based on the test conditions in response to the instruction from the server 30. With this configuration, the efficiency of the test of the tires 6 is enhanced.

Figure 5:
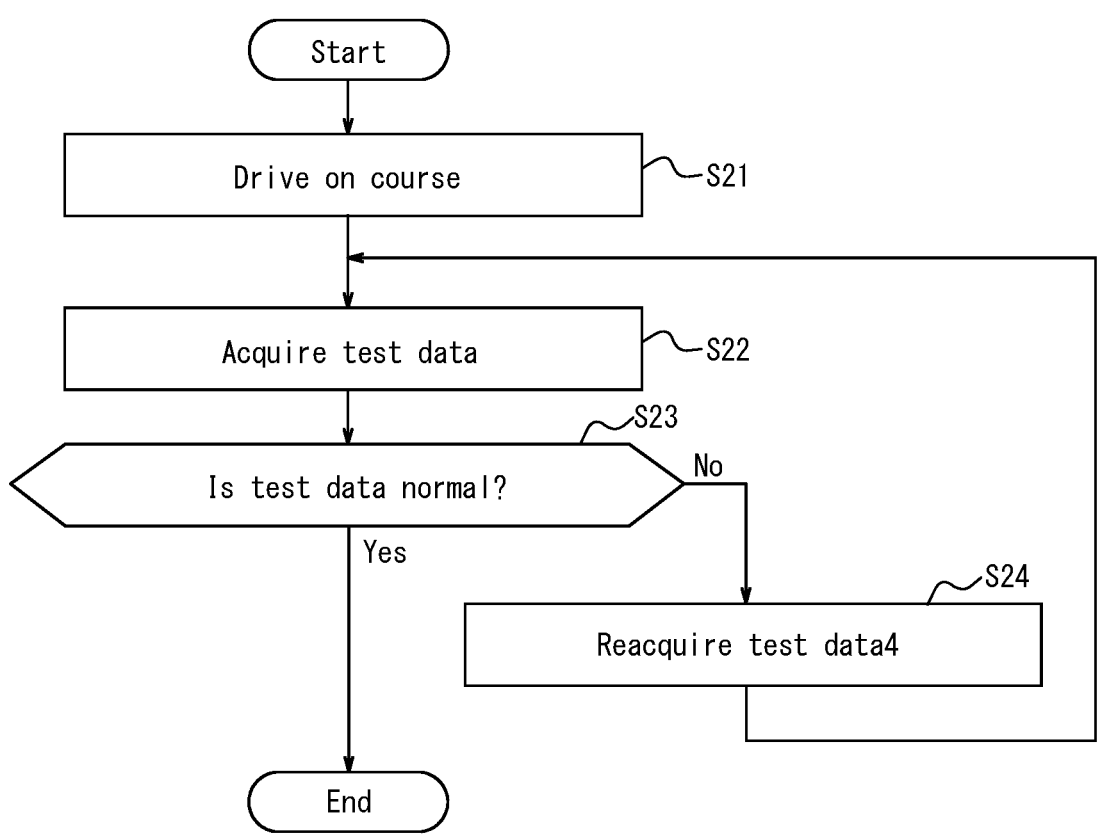
FIG. 5 is a flowchart illustrating a tire testing method using the tire testing system illustrated in FIG. 4.

FIG. 5 is a flowchart illustrating a tire testing method using the tire testing system 300 illustrated in FIG. 4. In FIG. 5, an example in which the controller 11 determines whether the test data is normal will be used.

According to the control method of the present embodiment, the controller 11 controls the vehicle 1 to drive on the course 200 (step S21).

The measurement device 31 acquires test data when the vehicle 1 drives through the test section 210 (step S22) and outputs the test data to the server 30. The server 30 acquires the test data of the tires 6 outputted from the measurement device 31 and transmits the acquired test data to the control device 10 installed in the vehicle 1 on which the tires 6 are mounted.

The controller 11 receives the test data transmitted from the server 30 and determines whether the test data is normal (step S23). The controller 11 may determine whether the test data is normal based on the test conditions.

When it is determined that the test data is normal (step S23: Yes), the controller 11 terminates the process after acquisition of all necessary test data.

When it is determined that the test data is not normal (step S23: No), the controller 11 causes the vehicle 1 to drive through the test section 210 so that the measurement device 31 can reacquire the test data (step S24).

In this way, a control method of the vehicle 1 according to the present embodiment includes a setting step of setting a weighting for the plurality of sensors 12 configured to detect information about the vehicle 1 or the course 200, and a detection step of performing detection of the position of the vehicle 1 and/or an obstacle around the vehicle 1 using the weighting for the plurality of sensors 12 and a detection result of the sensors 12. In the setting step of the present embodiment, the weighting is changed between the banked section 230 and sections other than the banked section 230.

Furthermore, the control device 10 of the present embodiment includes the controller 11. The controller 11 sets a weighting for the plurality of sensors 12 configured to detect information about the vehicle 1 or the course 200, and performs detection of the position of the vehicle 1 and/or an obstacle around the vehicle 1 using the weighting for the plurality of sensors 12 and a detection result of the sensors 12. The controller 11 of the present embodiment changes the weighting between the banked section 230 and sections other than the banked section 230.

The control system 100 according to the present embodiment includes the control device 10 for controlling the vehicle 1 that has the tires 6 mounted thereon and drives autonomously on the course 200, and the plurality of sensors 12 that detect information about the vehicle 1 or the course 200. The control device 10 includes the controller 11 that sets a weighting for the plurality of sensors 12, and performs detection of the position of the vehicle 1 and/or an obstacle around the vehicle 1 using the weighting for the plurality of sensors 12 and a detection result of the sensors 12. The controller 11 of the present embodiment changes the weighting between the banked section 230 and sections other than the banked section 230.

A tire testing method according to the present embodiment includes a step of controlling, in accordance with the above-described control method, the vehicle 1 to drive on the course 200, and a step of acquiring test data of the tires 6 mounted on the vehicle 1 driving on the course 200. The course 200 is a course for testing the tires 6.

Therefore, by more heavily weighting a sensor 12 whose detection accuracy tends not to be affected even in the banked section 230, the position of the vehicle 1 or an obstacle around the vehicle 1 can be detected accurately even in the banked section 230, thereby improving the driving safety of the vehicle 1 in the banked section 230.

The control method, control device 10, control system 100, and tire testing method according to the present disclosure are not limited to the specific configurations described in the above embodiments. Various modifications and changes may be made without departing from the scope of the claims.

REFERENCE SIGNS LIST

1 Vehicle
2 Engine
3 Power transmission device
4 Braking device
5 Steering device
6 Tire
7 First battery
10 Control device
11 Controller
12 Sensor
12a On-board sensor
12b Fixed point sensor
13 Communication device
14 Second battery
100 Control system
200 Course
200a, 200b Straight track
200c, 200d Curved track
210 Test section
220 Adjustment section
230 Banked section
240 Acceleration section
300 Tire testing system
30 Server
31 Measurement device

The invention claimed is:

1. A control method for controlling a vehicle that has tires mounted thereon and drives autonomously on a course,
the course including a banked section,
the control method comprising:
setting a weighting for a plurality of sensors configured to detect information about the vehicle or the course, the plurality of sensors including a plurality of image sensors; and
performing detection of at least one of a position of the vehicle or an obstacle around the vehicle using weighting for the plurality of sensors and a detection result of the sensors, wherein
in the setting, the weighting is changed between the banked section and sections other than the banked section; wherein
the plurality of sensors includes a mono camera, a GPS sensor, and a 3D-LiDAR sensor mounted on the vehicle, and
the position of the vehicle is detected, and the weighting is changed by using detection results of the mono camera and the GPS sensor and not using detection results of the 3D-LiDAR sensor in sections other than the banked section and using the detection results of the GPS sensor and the 3D-LiDAR sensor and not using the detection results of the mono camera in the banked section.

2. The control method of claim 1, wherein the weighting is changed in the banked section according to an inclination angle of a road surface.

3. A tire testing method comprising:
controlling, in accordance with the control method of claim 2, the vehicle to drive on the course; and
acquiring test data of tires mounted on the vehicle driving on the course, wherein
the course is a course for testing the tires.

4. A tire testing method comprising:
controlling, in accordance with the control method of claim 1, the vehicle to drive on the course; and
acquiring test data of tires mounted on the vehicle driving on the course, wherein
the course is a course for testing the tires.

5. A control method for controlling a vehicle that has tires mounted thereon and drives autonomously on a course,
the course including a banked section,
the control method comprising:
setting a weighting for a plurality of sensors configured to detect information about the vehicle or the course, the plurality of sensors including a plurality of image sensors; and
performing detection of at least one of a position of the vehicle or an obstacle around the vehicle using weighting for the plurality of sensors and a detection result of the sensors, wherein
in the setting, the weighting is changed between the banked section and sections other than the banked section; wherein
the plurality of sensors includes a 2D-LiDAR sensor and a stereo camera mounted on the vehicle and a 3D-LiDAR sensor installed by the banked section, and
the obstacle around the vehicle is detected, and the weighting is changed by using detection results of the 2D-LiDAR sensor and the 3D-LiDAR sensor and not using detection results of the stereo camera in sections other than the banked section and using the detection results of the 3D-LiDAR sensor and the stereo camera and not using detection results of the 2D-LiDAR sensor in the banked section.

6. A device for controlling a vehicle that has tires mounted thereon and drives autonomously on a course,
the course including a banked section,
the control device comprising
at least one processor configured to
set a weighting for a plurality of sensors configured to detect information about the vehicle or the course, the plurality of sensors including a plurality of image sensors, and perform detection of at least one of a position of the vehicle or an obstacle around the vehicle using weighting for the plurality of sensors and a detection result of the sensors, and the controller is configured to change the weighting between the banked section and sections other than the banked section; wherein
the plurality of sensors includes a 2D-LiDAR sensor and a stereo camera mounted on the vehicle and a 3D-LiDAR sensor installed by the banked section, and
the obstacle around the vehicle is detected, and the weighting is changed by using detection results of the 2D-LiDAR sensor and the 3D-LiDAR sensor and not using detection results of the stereo camera in sections other than the banked section and using the detection results of the 3D-LiDAR sensor and the stereo camera and not using detection results of the 2D-LiDAR sensor in the banked section.

7. A control system comprising:
at least one processor configured to control a vehicle that has tires mounted thereon and drives autonomously on a course; and
a plurality of sensors configured to detect information about the vehicle or the course, the plurality of sensors including a plurality of image sensors, wherein
the course includes a banked section,
at least one processor is configured to
set a weighting for the plurality of sensors, and perform detection of at least one of a position of the vehicle or an obstacle around the vehicle using weighting for the plurality of sensors and a detection result of the sensors, and
change the weighting between the banked section and sections other than the banked section; wherein
the plurality of sensors includes a 2D-LiDAR sensor and a stereo camera mounted on the vehicle and a 3D-LiDAR sensor installed by the banked section, and
the obstacle around the vehicle is detected, and the weighting is changed by using detection results of the 2D-LiDAR sensor and the 3D-LiDAR sensor and not using detection results of the stereo camera in sections other than the banked section and using the detection results of the 3D-LiDAR sensor and the stereo camera and not using detection results of the 2D-LiDAR sensor in the banked section.

8. A device for controlling a vehicle that has tires mounted thereon and drives autonomously on a course,
the course including a banked section,
the control device comprising
at least one processor configured to
set a weighting for a plurality of sensors configured to detect information about the vehicle or the course, the plurality of sensors including a plurality of image sensors, and perform detection of at least one of a position of the vehicle or an obstacle around the vehicle using weighting for the plurality of sensors and a detection result of the sensors, and the controller is configured to change the weighting between the banked section and sections other than the banked section; wherein the plurality of sensors includes a mono camera, a GPS sensor, and a 3D-LiDAR sensor mounted on the vehicle, and the position of the vehicle is detected, and the weighting is changed by using detection results of the mono camera and the GPS sensor and not using detection results of the 3D-LiDAR sensor in sections other than the banked section and using the detection results of the GPS sensor and the 3D-LIDAR sensor and not using the detection results of the mono camera in the banked section.

9. A control system comprising:

at least one processor configured to control a vehicle that has tires mounted thereon and drives autonomously on a course; and a plurality of sensors configured to detect information about the vehicle or the course, the plurality of sensors including a plurality of image sensors, wherein the course includes a banked section, at least one processor is configured to
set a weighting for the plurality of sensors, and perform detection of at least one of a position of the vehicle or an obstacle around the vehicle using weighting for the plurality of sensors and a detection result of the sensors, and
change the weighting between the banked section and sections other than the banked section; wherein the plurality of sensors includes a mono camera, a GPS sensor, and a 3D-LiDAR sensor mounted on the vehicle, and the position of the vehicle is detected, and the weighting is changed by using detection results of the mono camera and the GPS sensor and not using detection results of the 3D-LiDAR sensor in sections other than the banked section and using the detection results of the GPS sensor and the 3D-LIDAR sensor and not using the detection results of the mono camera in the banked section.

* * * * *